INVENTOR.
RICHARD T. ZIEHM

ATTORNEY

United States Patent Office 3,454,884
Patented July 8, 1969

3,454,884
DUTY CYCLE CONTROL CIRCUIT
Richard T. Ziehm, Webster, N.Y., assignor to Xerox Corporation, Rochester, N.Y., a corporation of New York
Filed Nov. 1, 1966, Ser. No. 591,175
Int. Cl. H03k 3/04
U.S. Cl. 328—61                                       4 Claims

ABSTRACT OF THE DISCLOSURE

Herein there is disclosed a control circuit for varying the duty operational cycle wherein actuation of a bistable device is selectively inhibited during a predetermined interval by appropriate delay circuits. Responsive to the condition of the aforementioned device, and in cooperation therewith, another bistable device reacts to effect output signals of either of two desired durations.

---

This invention relates generally to electric control circuits, and, more specifically, to circuits which control the duty cycle of a particular apparatus.

There exists many applications wherein it is desirable to manually alter the duty cycle or operation period of a desired apparatus.

In the situation where the particular apparatus is operating in a normal mode, or in accordance with a fixed predetermined duty cycle, it is frequently desirable to manually operate the apparatus involved for a longer period of time or to change its duty cycle. By duty cycle it is meant that ratio of operating time to a predetermined time interval.

A duty cycle control circuit is, therefore, desirably simple and inexpensive as well as reliable. It is also preferable to be able to alter the duty cycle regardless of the present state of the control circuit and the apparatus it controls.

Therefore, it is an object of the present invention to improve electric control circuits, and, more specifically, duty cycle control circuits.

It is another object of the present invention to provide a novel duty cycle control circuit which is reliable, simple, and inexpensive.

Additionally, an object of the present invention is to provide a novel duty cycle control circuit which can be actuated at any point during the operation of the particular apparatus to be controlled.

These and other objects as may become apparent are accomplished in accordance with the principles of the present invention wherein the conditions of two bistable devices are monitored and each bistable device is placed in one condition or the other depending upon the enabling of the particular delay circuit.

Figure 1:
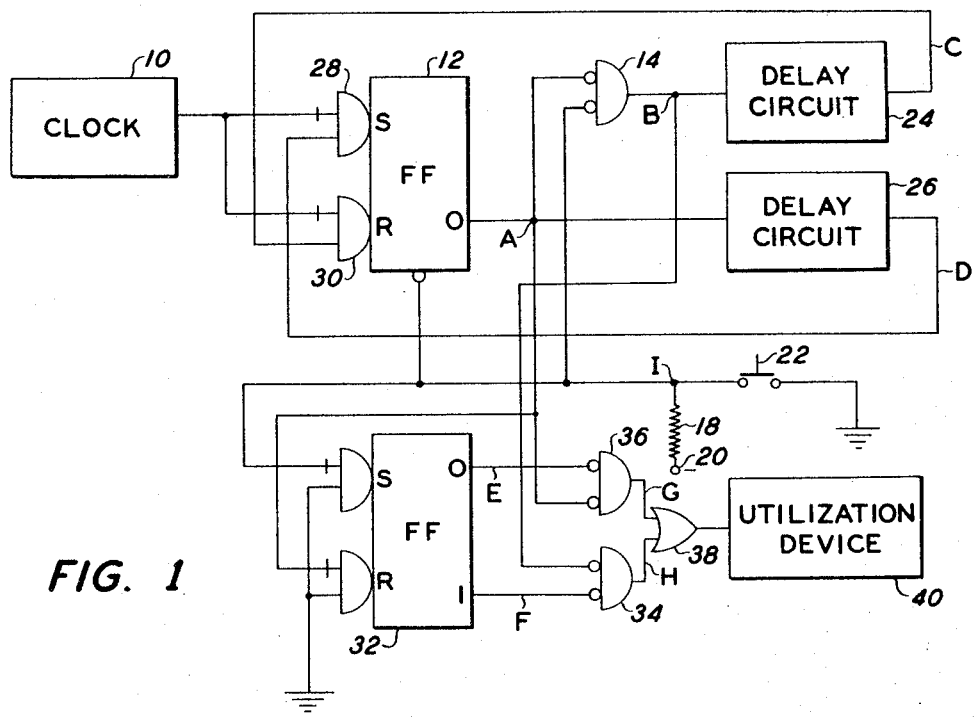
Figure 2:
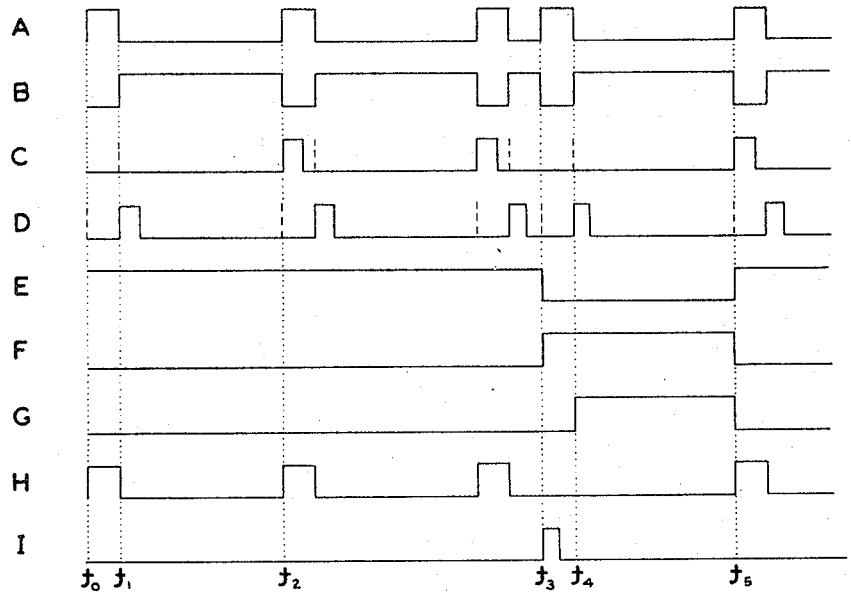

For a better understanding of the present invention as well as other objects and features thereof, reference may be made to the following description of the invention to be read in connection with the accompanying drawings wherein:

FIGURE 1 is a schematic representation of the circuit in accordance with the principles of the present invention; and, FIGURE 2 illustrates the waveforms helpful in understanding the operation of the circuit of FIGURE 1.

Reference will now be made to FIGURES 1 and 2. The letter designations seen in FIGURE 1 refer to identically designated waveforms in FIGURE 2 and indicate that these waveforms will appear at the particular input or output conductor designated. The dashed lines in FIGURE 2 represent the initiation of a time delay which will be more fully described hereinafter.

It is understood that the conventional bistable elements or flip-flops in FIGURE 1 are in their reset condition initially. It is also assumed that the clock pulses generated by the clock pulse generator 10 in FIGURE 1 are of such a high frequency that they may be considered to be always present at the respective inputs to the AND gates associated with the flip-flop 12.

The initial state of the circuit of FIGURE 1 is characterized by the waveforms A through I in FIGURE 2 at the time $t_0$. As shown by the waveform A in FIGURE 2, the flip-flop 12 has a normally high signal at its zero output. This output provides one input to a conventional AND gate 14. The small circles at the inputs of this AND gate indicate that a relatively low input signal activates the function. The other input to this AND gate is derived via a load resistor 18 from a source of suitable negative potential applied at terminal 20. With the manual switch 22 in its normal released position, this signal is at a low level suitable for activating the function of AND gate 14.

At time $t_0$, in FIG. 2, the output from the gate 14, waveform B, is at a low level indicating that the gate's function has not been activated.

Two lead edge delay circuits 24 and 26 are responsive to the output of the AND gate 14 and the output from flip-flop 12, respectively, to produce signals represented by waveforms C and D, respectively, in FIG. 2.

The lead edge delay circuits 24 and 26 in FIGURE 1 are of conventional design such that a positive going lead edge of a pulse, or that edge of the pulse which goes from a low level to a relatively higher level, is delayed for a predetermined time before being passed to the output of the delay circuit. For purposes of this description, this delay is approximately 50 seconds and 10 seconds for delay circuits 24 and 26, respectively. However, at time $t_0$ in FIGURE 2, the delay circuit 26 detects a leading edge from the output of flip-flop 12. Upon this detection, the delay circuit 26 begins its time delay interval which will be, for example, 10 seconds. This is represented in the low level condition $t_0$–$t_1$ of waveform D in FIGURE 2.

In FIGURE 1, the enabling output from the delay circuit 26 is coupled to the DC level input of the set side input AND gate 28 of the flip-flop 12. The clock input, denoted by the intersecting line, to this gate 28 is connected to a conventional clock pulse generator 10, for example. When the delay circuit 26 is delaying a lead edge of a pulse at its input, the DC level input to the set side input gate 28 is disabled thereby inhibiting the setting of this flip-flop 12.

The output from the delay circuit 24 represented by waveform C in FIGURE 2, is normally low level. As shown in FIGURE 1 this output is directly connected to a DC level input of the reset side input AND gate 30. While in this low level condition, the delay circuit 24 inhibits the resetting of the flip-flop 12 in a manner similar to that in which the delay circuit 26 inhibits the setting of the flip-flop as hereinabove described. The clock input of this AND gate 30 associated with the reset input of flip-flop 12 is directly connected to the clock pulse generator 10 as was the clock input to the set input gate 28.

The second flip-flop in FIGURE 1, flip-flop 32, is in a normally reset condition as shown by waveforms E and F which indicate a normally low level signal at its one output and a normally high level signal at its zero output. As shown, the AND gates (not numbered) associated with the set and reset inputs have their DC level inputs grounded so as to let any signal on the clock level input set or reset this flip-flop.

The one output of flip-flop 32 forms one input to a conventional AND gate 34 while the other or zero output of this flip-flop 32 forms the input of a second AND gate 36. Again, the small circles at the inputs of these AND gates indicate that a relatively low input signal activates the function. The other input to AND gate 34 is derived from the output of the AND gate 14 while the other input to AND gate 36 comes directly from the output of the flip-flop 12.

The outputs from AND gates 36 and 34 are represented respectively by waveforms G and H in FIGURE 2. The outputs of these AND gates 34 and 36 provide the inputs to a conventional OR gate 38 which will translate the outputs of the AND gates 34 and 36 to any desirable utilization means 40, for example, a motor control circuit which controls a motor over a particular cycle.

The waveform I in FIGURE 2 denotes the signal at a node similarly designated in FIGURE 1 to which is connected a reference potential, such as ground, by way of manually depressable switch 22 when this switch is depressed.

The time delay designed into delay circuit 26 is represented in FIGURE 2 by the time interval $t_0$–$t_1$. Therefore, at $t_1$ the output from the delay circuit 26 represented by waveform D in FIGURE 2 goes to a high level which enables the DC level input to the set input AND gate 28 of flip-flop 12. This permits the next received clock pulse to set this flip-flop. In the set condition the zero output of this flip-flop 12 goes to a low level. The AND gate 14 which monitors the zero output of the flip-flop 12 provides a high level output coincidentally with the set condition of this flip-flop 12 as long as its other input is at a low level, as represented by waveform I in FIGURE 2. This high level output from AND gate 14 provides a leading edge at the input of delay circuit 24 which delays this edge for approximately 50 seconds, for example. The output of this delay circuit 24 is connected to the DC level input to the reset side AND gate 30. Therefore, during the 50 seconds which the delay circuit 24 delays the lead edge of the pulse beginning at time $t_1$ in waveform C of FIGURE 2, this input to the AND gate 30 is disabled thereby inhibiting resetting of this flip-flop. The time delay of this delay circuit 24 is represented by the time interval in FIGURE 2 of $t_1$–$t_2$.

During the time interval $t_0$–$t_1$, the AND gate 34, the output of which is represented by waveform H in FIGURE 2, detects two low level inputs which activate this element to provide a high level signal during the reset condition of flip-flop 12. This output from AND gate 34 will substantially correspond in duration to the time delay afforded by the delay circuit 26. The OR gate 38 passes this pulse to the utilization device 40 which may, for example, control the energization of a particular motor or other apparatus.

At the end of the delay interval designed into delay circuit 24, or that interval $t_1$–$t_2$ in FIGURE 2, the delay circuit 24 produces a high level output which enables the DC level input to the AND gate 30 thereby permitting the next clock pulse from the clock pulse generator 10 to reset the flip-flop 12. Upon the resetting of this flip-flop 12, the condition of the circuit of FIGURE 1 returns to the same initial condition as was hereinabove described.

At time $t_2$ in FIGURE 2 coincidentally with the resetting of the flip-flop 12, the output from the zero side thereof returns to its normally high level thereby generating a leading edge which again activates the time delay circuit 26 associated therewith. From this point, the above described cycle of operation will repeat itself generating an approximate 10 second output pulse to the utilization means 40 for every 60 seconds. Therefore, the utilization means can be said to have a 10 second duty cycle out of a possible 60 second time interval.

If it is desirable to temporarily alter the duty cycle of the utilization means 40, an operator, for example, may do so by depressing the button 22 in FIGURE 1. In FIGURE 2, this depression of the button 22 is represented by the pulse initiated at time $t_3$ in waveform I.

The effect of the depression of this button is to momentarily, during the depressed state of the button, disable completely AND gate 14. As seen in waveform B associated with AND gate 14, the depression of this button is not noticeable since the AND gate was already in a disabled state at time $t_3$.

One important effect of depressing the button 22 is that the flip-flop 32 is set by the leading edge generated by this depression as seen in waveform I. This set condition of flip-flop 32 places a high level signal at its one output and a low level signal at its zero output. Another important result of the depression of the switch or button 22 is the resetting override control on flip-flop 12. Thus, if flip-flop 12 is in a set condition prior to the depressing of this button 22, flip-flop 12 will be reset when this button is depressed.

At a very short time after $t_3$, the button 22 is in a released state and therefore the waveform I has returned to a low level and the circuit of FIGURE 1 commences to operate in the following manner.

The lead edge of the output signal from the flip-flop 12 generated when this flip-flop is reset initiates the delay circuit 26. This delay interval is shown in FIG. 2 as $t_3$–$t_4$ and may be, for example, approximately 50 seconds. During this interval the setting of flip-flop 12 is inhibited by the low level signal applied to the set side input gate 28 from the output of the delay circuit 26.

Also during this period $t_3$–$t_4$, gates 34 and 36 are disabled by the high level signals at the outputs of flip-flops 32 and 12, respectively. Accordingly, no output signal is delivered to the utilization device 40 by OR gate 38.

However, at time $t_4$ an enabling signal is generated by the delay circuit 26 and supplied to the AND gate 28 thereby permitting the next clock pulse from generator 10 set the flip-flop 12. At this point in time, both flip-flops 12 and 32 are in a set condition and AND gate 36 now detects two enabling low level signals from the set flip-flops 12 and 32. Therefore, as shown in FIG. 2, waveform G, the output from this gate 36 is a high level signal having a duration in time of $t_4$–$t_5$.

At time $t_5$, the delay circuit 24 generates an enabling signal which is supplied to gate 30 thereby permitting the next clock pulse to reset the flip-flop 12. This enabling signal from delay circuit 24 represents the lead edge signal generated at the output of the AND gate 14 when the flip-flop 12 was set at time $t_4$. The interval $t_4$–$t_5$ represents the delay of the delay circuit 24.

Also, at time $t_5$, flip-flop 32 is reset by the signal from the output of the flip-flop 12 when the latter is reset. This resetting of both flip-flops terminates the output pulse from AND gate 36 and thereby concludes one cycle of operation of the circuit of FIGURE 1.

From time $t_5$, the circuit will repeat the normal cycle of operation as hereinabove described.

Therefore, immediately after the depression and release of the button 22 in FIGURE 1, an output signal is supplied to the utilization means 40 via OR gate 38 which has a duration of approximately 50 seconds. This then would provide a duty cycle of 50/60 or, in other words the utilization means will be energized 50 seconds out of a possible 60 seconds, for example. Once this 50 second signal is provided to the utilization means 40 and the button remains in its initial released condition, the 10/60 duty cycle operation will be reinstated and continue uninterrupted as hereinabove described. If for any reason, it is desired to increase the duty cycle as formerly described, then the button 22 may be manually depressed to initiate this change in the duty cycle. It is noted that this alteration in the duty cycle may take place at any point in the operation of the circuit of FIGURE 1 since the depression of the button will automatically place the flip-flop 12 in a reset condition to initiate this alteration in duty cycle.

If this button is depressed during the reset condition of flip-flop 12, there may be an output signal delivered to the utilization device 40 having a very short duration. This duration will be equal approximately to the time period the button is in a depressed state. Although such a brief signal normally will have no significant effect on the results, it may be desirable to use a momentary contact switch for button 22 which automatically limits the pulse in waveform I of FIG. 2 to a short duration regardless of the period of depression.

While the invention has been described with reference to the circuit disclosed herein it is not confined to the details set forth since it is apparent that electrical equivalent components may be substituted for the components of the preferred circuit without departing from the scope of the invention. Thus, for example, the flip-flop and gates may be replaced with other combinations of components to perform the same function as those obtained in the circuit shown in FIGURE 1.

Although reference has been made earlier to specific time delays designed into delay circuits 24 and 26, it is apparent to one skilled in the art that these time intervals may be varied to suit a particular purpose. In addition, while the above description has said nothing about varying the delay times of these circuits 24 and 26, it would be compatible with the concept of the present invention to utilize variable delays in these circuits which may be readily changed.

It is therefore the intention of the applicant to cover such modifications or changes as may come within the scope of the invention as defined by the following claims:

What is claimed is:
1. A control circuit for a utilization device comprising:
   (a) a source of pulses having a constant frequency;
   (b) first bistable means having two stable states and responsive to said pulses for alternating between one and the other of said two stable states;
   (c) first delay means for inhibiting said first bistable means from going from one of said stable states to the other for a first predetermined time;
   (d) second delay means for inhibiting said first bistable means from going from said other of said stable states to said one of said stable states for a second predetermined time;
   (e) signal means for generating a first and second signal;
   (f) second bistable means having first and second stable states and responsive to said second signal for going from said first stable state to said second stable state and responsive to the transition of said first bistable means from said other stable state to said one stable state for going from said second stable state to said first stable state;
   (g) first gating means for generating an output signal upon the coincidence of said other stable state in said first bistable means and said second stable state in said second bistable means; and
   (h) second gating means for generating an output signal upon the coincidence of said first signal, said one stable state in said first bistable means, and said first stable state in said second bistable means.
2. A control circuit as defined in claim 1 wherein:
   (a) said first delay means is responsive to the transition of said first bistable means from said other to said one stable states:
   (b) said second delay means is responsive to the coincidence of said first signal and said other stable state in said first bistable means;
   (c) said first bistable means is further responsive to said second signal for going from said other stable state to said one stable state; and,
   (d) wherein said first and second predetermined times are unequal.
3. A control circuit comprising:
   (a) a source of pulses having a constant frequency;
   (b) a first bistable means having an output terminal and two stable states and responsive to the coincidence of one of said pulses and a first enabling signal for going from one of said stable states to the other stable state and responsive to the coincidence of one of said pulses and a second enabling signal for going from said other stable state to said one stable state;
   (c) first delay means coupled to said output terminal for generating said first enabling signal a first predetermined time interval after said first bistable means goes to said one stable state;
   (d) selectively actuatable switch means for generating a first and second signal condition;
   (e) first gating means responsive to the coincidence of said other stable state in said first bistable means and said first signal condition for generating a coincidence output signal indicative of said coincidence;
   (f) second delay means coupled to said gating means for generating said second enabling signal a second predetermined time interval after said coincidence output signal;
   (g) coupling means coupled between said switch means and said first bistable for causing said first bistable means to go to said one stable state in response to said second signal condition;
   (h) second bistable means having a first and second stable state and a first and second output terminal and responsive to said second signal condition for going from said first to said second stable state and responsive to the transition from said other stable state to said one stable state in said first bistable means for going from said second to said first stable state;
   (i) a control signal receiving terminal;
   (j) second gating means coupled to said output terminal of said first bistable means and said first output terminal of said second bistable means and responsive to the coincidence of said other stable state in said first bistable means and said second stable state in said second bistable means for generating a first control signal at said control signal receiving terminal; and,
   (k) third gating means coupled to said first gating means and said second output terminal of said second bistable means and responsive to the coincidence of said first stable state in said second bistable means and the absence of said coincidence output signal for generating a second control signal at said control signal receiving terminal.
4. A control circuit as defined in claim 3 wherein:
   (a) said first delay means is responsive to the transition of said first bistable means from said other stable state to said one stable state;
   (b) said second delay means is responsive to the coincidence of said first signal condition and the transition of said first bistable means from said one stable state to said other stable state; and,
   (c) said first bistable means when in said other stable state is responsive to said second signal to condition return to said one stable state.

References Cited

UNITED STATES PATENTS 3,388,346    6/1968    Roof et al. _____ 307—293 XR

ARTHUR GAUSS, Primary Examiner

STANLEY D. MILLER, Assistant Examiner

U.S. Cl. X.R.

328—74, 94, 97, 191, 196, 206; 307—265, 267, 293